United States Patent [19]

Nishioka et al.

[11] Patent Number: 4,816,429

[45] Date of Patent: Mar. 28, 1989

[54] TEMPERATURE COMPENSATING DIELECTRIC CERAMIC COMPOSITION

[75] Inventors: Goro Nishioka, Ibaraki; Yukio Sakabe, Kyoto, both of Japan

[73] Assignee: Murata Manufacturing Co., Ltd., Japan

[21] Appl. No.: 88,878

[22] Filed: Aug. 24, 1987

[30] Foreign Application Priority Data

Aug. 25, 1986 [JP] Japan .................... 61-199801
Aug. 25, 1986 [JP] Japan .................... 61-199800

[51] Int. Cl.$^4$ ................... C04B 35/48; C04B 35/14
[52] U.S. Cl. ................... 501/135; 501/104; 501/105; 501/125; 501/133; 501/153; 501/154
[58] Field of Search ................... 501/104, 105–107, 501/123, 125, 133–135, 153, 154

[56] References Cited

U.S. PATENT DOCUMENTS

| 3,188,368 | 6/1965 | Stewart | 501/104 |
| 3,519,448 | 7/1970 | Alper | 501/104 |
| 3,632,359 | 1/1972 | Alper | 501/104 |
| 3,972,722 | 8/1976 | Holt et al. | 501/104 |
| 4,010,039 | 3/1977 | de Aza et al. | 501/104 |
| 4,292,083 | 9/1981 | Rauch | 501/104 |

FOREIGN PATENT DOCUMENTS

| 38-19593 | 9/1963 | Japan | 501/104 |
| 39-26064 | 11/1964 | Japan | 501/104 |
| 49-33084 | 9/1974 | Japan | 501/104 |
| 52-61800 | 5/1977 | Japan | 501/104 |
| 53-120618 | 10/1978 | Japan | 501/104 |
| 60-137869 | 7/1985 | Japan | 501/104 |
| 60-137868 | 7/1985 | Japan | 501/104 |
| 61-23268 | 10/1986 | Japan | 501/104 |
| 866733 | 5/1961 | United Kingdom | 501/104 |
| 1097045 | 12/1967 | United Kingdom | 501/104 |

Primary Examiner—William R. Dixon, Jr.
Assistant Examiner—Andrew B. Griffis
Attorney, Agent, or Firm—Ostrolenk, Faber, Gerb & Soffen

[57] ABSTRACT

A dielectric ceramic composition for temperature compensating monolithic ceramic capacitors consists essentially of a solid solution composed of barium oxide, strontium oxide, silicon oxide and zirconium oxide, which, when calculated in terms of BaO, SrO, SiO$_2$ and ZrO$_2$ respectively and expressed by the formula:

$$x(BaO_{1-a}SrO_a) - ySiO_2 - zZrO_2$$

(wherein x, y, z are the weight percentages of the respective components, $x+y+z=100$, and $0 \leq a \leq 0.9$), have compositional proportions falling within the polygonal area defined by the points A, B, C and D in FIG. 1, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

The composition may contain, as an additive, aluminum oxide in an amount of not more than 20 parts by weight in terms of Al$_2$O$_3$ per 100 parts by weight of the basic composition.

4 Claims, 1 Drawing Sheet

TEMPERATURE COMPENSATING DIELECTRIC CERAMIC COMPOSITION

BACKGROUND OF THE INVENTION

1. Field of the Invention

This invention relates to a temperature compensating dielectric ceramic composition and, more particularly, a dielectric ceramic composition for temperature compensating monolithic ceramic capacitors.

2. Description of the Prior Art

As a dielectric material for temperature compensating monolithic ceramic capacitors, there have so far been used dielectric ceramic compositions of a system $MgTiO_3$—$CaTiO_3$.

However, such compositions of the $MgTiO_3$—$CaTiO_3$ system have a high sintering temperature of not less than 1300° C., resulting in increase of the manufacturing cost of capacitors. For example, when such a ceramic composition is used as a dielectric material for monolithic ceramic capacitors, it is required to use an noble metal with a high melting temperature such as Pd, Pt, etc., as a material for internal electrodes since the electrodes are subjected to a high temperature of 1300° C. and above during sintering of the ceramic composition. The sintering at such a high temperature and use of noble metals cause increase of the manufacturing cost of the monolithic ceramic capacitors.

In addition, if the above ceramic compositions are fired in a nonoxidizing atmosphere, there is considerable lowering of the insulation resistance because of reduction of the oxides.

SUMMARY OF THE INVENTION

It is therefore an object of the present invention to provide a dielectric ceramic composition for temperature compensating ceramic capacitors, which can be sintered at a low temperature of not more than 1000° C. and has a high specific resistance of not less than $10^{12}$ Ωcm even if fired in a nonoxidizing atmosphere.

According to the present invention, there is provided a temperature compensating dielectric ceramic composition consisting essentially of a solid solution composed of barium oxide, silicon oxide and zirconium oxide, said three components, when calculated in terms of BaO, $SiO_2$ and $ZrO_2$ respectively and expressed by the formula:

$$xBaO\text{—}ySiO_2\text{—}zZrO_2$$

(wherein x, y and z are the weight percentage of percentages of the respective components and $x+y+z=100$), having compositional proportions falling within the polygonal area defined by the points A, B, C and D in FIG. 1 where $\alpha=0$, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

In a preferred embodiment of the present invention, up to 90 percent of barium oxide in the above composition is replaced with strontium oxide. According to the present invention, there is also provided a temperature compensating dielectric ceramic composition consisting essentially of a solid solution composed of barium oxide, strontium oxide, silicon oxide and zirconium oxide, said components, when calculated in terms of BaO, SrO, $SiO_2$ and $ZrO_2$ respectively and expressed by the formula:

$$x(BaO_{1-\alpha}SrO_\alpha)\text{—}ySiO_2\text{—}zZrO_2$$

wherein x, y and z are weight percentage of respective components and $x+y+z=100$, $0<\alpha\leq0.9$, having compositional proportions falling within the polygonal area defined by the points A, B, C and D in FIG. 1 the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

In another embodiment, the dielectric ceramic composition of the present invention contains, as an additive, aluminum oxide in an amount of not more than 20 parts by weight in terms of $Al_2O_3$ per 100 parts by weight of the composition expressed by the above formula:

$$xBaO\text{—}ySiO_2\text{—}zZrO_2, \text{ or}$$

$$x(BaO_{1-\alpha}SrO_\alpha)\text{—}ySiO_2\text{—}zZrO_2.$$

Thus, there is further provided a temperature compensating dielectric ceramic composition consisting essentially of a basic composition and an additive of aluminum oxide, the content of aluminum oxide being not more than 20 parts by weight per 100 parts by weight of said basic composition, said basic composition consisting essentially of a solid solution composed of barium oxide, strontium oxide, silicon oxide and zirconium oxide, said components of the basic composition, when calculated in terms of BaO, SrO, $SiO_2$ and $ZrO_2$ respectively and expressed by the formula:

$$x(BaO_{1-\alpha}SrO_\alpha)\text{—}ySiO_2\text{—}zZrO_2$$

wherein x, y and z are weight percentages of the respective components, $x+y+z=100$, and $0\leq\alpha\leq0.9$), having compositional proportions falling within the polygonal area defined by the points A, B, C and D in FIG. 1, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

The above dielectric ceramic composition may be produced by a process comprising the steps of preparing ceramic green compacts, firing them in a nonoxidizing atmosphere composed of a nonoxidizing gas such as $N_2$, Ar, $CO_2$, CO, $H_2$ and the like at a temperature of not more than 1000° C.

The thus produced dielectric ceramic composition has a high specific resistance of no less than $10^{12}$ Ωcm and a high Q value of not less than 1000. The Q value is the inverse of the loss tangent (tan δ), that is, Q=1/tan δ. Thus, the greater the Q value, the smaller the dielectric loss. The dielectric ceramic composition of the present invention has a low sintering temperature, thus making it possible to reduce the sintering cost of the product. Also, if the dielectric ceramic composition is used as a dielectric material for monolithic ceramic capacitors, its low sintering temperature makes it possible to use an inexpensive metal such as copper, copper alloys and base metals as a material for internal electrodes. Accordingly, the present invention makes it possible to achieve reduction of the manufacturing cost of the monolithic ceramic capacitors.

The reasons why the dielectric ceramic composition of the present invention has been limited to those having a set of x, y and z falling within the polygonal area defined by the points A, B, C and D in FIG. 1 are as follows. If the composition is the one having at set of x, y and z falling in the area outside of the side AB of a quadrangle ABCD in FIG. 1, the Q value becomes less than 1000 and the temperature coefficient of capacitance becomes more than +100 ppm/°C. Also, there is formation of a glassy material on sintered ceramic bodies.

If the composition is the one having a set of x, y and z falling in the area outside of the side AD of the quadrangle ABCD in FIG. 1, the Q value becomes less than 1000 and the temperature coefficient of capacitance becomes more than +100 ppm/°C. Also, there is formation of a glassy material on sintered ceramic bodies.

If the composition is one having a set of x, y and z falling in the area outside of the side BC of the quadrangle ABCD in FIG. 1, it is impossible to produce dense ceramic bodies even if sintered at a temperature of 1150° C.

If the composition is one having a set of x, y and z falling in the area outside of the side CD of the quadrangle ABCD, it is impossible to produce dense ceramic bodies even if fired at a temperature of 1150° C. If the composition contains no barium oxide, i.e., alpha=1, it is impossible to produce dense ceramic bodies.

If the dielectric ceramic composition contains no strontium oxide, melting of the product is initiated at a temperature of more than 1000° C. In order to improve the sintering properties of the composition, therefore, it is preferred to replace a part of barium oxide with strontium oxide. However, if more than 90 percent of barium oxide is replaced with strontium oxide, it becomes difficult to produce dense dielectric ceramic bodies.

The addition of $Al_2O_3$ to the above basic composition contributes to minimize variation of the ceramic characteristics due to change in composition and to produce ceramic bodies with uniform characteristics. However, if the added amount of $Al_2O_3$ exceeds 20 parts by weight per 100 parts by weight of the above basic composition, the sintering temperature becomes higher than 1000° C.

The above and other objects, features and advantages of the present invention will be further apparent from the following description with reference to the examples.

EXAMPLES

Figure 1:
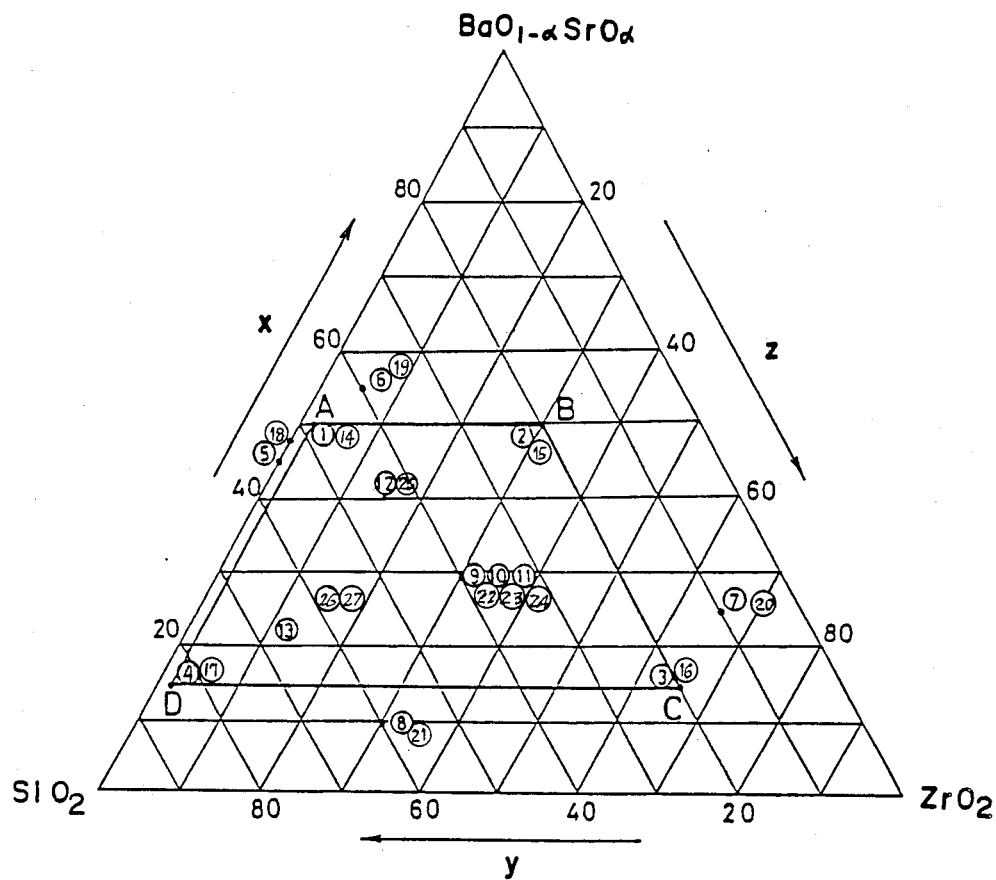
FIG. 1 is a triangular diagram of a $BaO_{1-\alpha}SrO_\alpha$ system showing a commpositional area of the temperature compensating dielectric ceramic composition of the present invention. The compositions listed in Tables 1 and 2 are indicated in FIG. 1 by circled specimen numbers. Thus, the numbers on the drawings correspond to the respective specimen numbers listed in Tables 1 and 2.

As raw materials there were used $BaCO_3$, $SrCO_3$, $SiO_2$, $ZrO_2$ and $Al_2O_3$. The raw materials were weighed to prepare a mixture so that the resultant sintered body has a composition shown in Table 1, milled by the wet process in a ball mill for 16 hours, and then dried by vaporization to prepare mixed powder of raw materials. The mixture was calcined at 850° C. for 2 hours, milled by the wet process for 16 hours together with 5 parts by weight of polyvinyl alcohol, dried and then passed through a 80 mesh sieve. The resultant granulated powder was compacted under a pressure of 2000 Kg/cm² to form green ceramic disks with a diameter of 22 mm and a thickness of 1.0 mm. The green compacts were fired in a nitrogen gas atmosphere at a temperature shown in Table 2 for 2 hours

TABLE 1

| | Basic Composition (wt %) | | | | | | Additive (parts by weight) |
|---|---|---|---|---|---|---|---|
| | $x(BaO_{1-\alpha}SrO_\alpha)$ | | | y | z | |
| No. | x | α | BaO | SrO | $SiO_2$ | $ZrO_2$ | $Al_2O_3$ |
| 1 | 50 | 0 | 50 | 0 | 49 | 1 | 0 |
| 2 | 50 | 0 | 50 | 0 | 20 | 30 | 0 |
| 3 | 15 | 0 | 15 | 0 | 20 | 65 | 0 |
| 4 | 15 | 0 | 15 | 0 | 84 | 1 | 0 |
| 5* | 45 | 0 | 45 | 0 | 55 | 0 | 0 |
| 6* | 55 | 0 | 55 | 0 | 40 | 5 | 0 |
| 7* | 25 | 0 | 25 | 0 | 10 | 65 | 0 |
| 8* | 10 | 0 | 10 | 0 | 60 | 30 | 0 |
| 9 | 30 | 0 | 30 | 0 | 40 | 30 | 5 |
| 10 | 30 | 0 | 30 | 0 | 40 | 30 | 20 |
| 11* | 30 | 0 | 30 | 0 | 40 | 30 | 25 |
| 12 | 40 | 0 | 40 | 0 | 45 | 15 | 5 |
| 13 | 25 | 0 | 25 | 0 | 60 | 15 | 5 |
| 14 | 50 | 0.5 | 25 | 25 | 49 | 1 | 0 |
| 15 | 50 | 0.3 | 35 | 15 | 20 | 30 | 1 |
| 16 | 15 | 0.7 | 4.5 | 10.5 | 20 | 65 | 5 |
| 17 | 15 | 0.8 | 3 | 12 | 84 | 1 | 2 |
| 18* | 45 | 0.4 | 27 | 18 | 55 | 0 | 4 |
| 19* | 55 | 0.7 | 16.5 | 38.5 | 40 | 5 | 10 |
| 20* | 25 | 0.3 | 17.5 | 7.5 | 10 | 65 | 15 |
| 21* | 10 | 0.2 | 8 | 2 | 60 | 30 | 15 |
| 22 | 30 | 0.9 | 3 | 27 | 40 | 30 | 0 |
| 23 | 30 | 0.4 | 18 | 12 | 40 | 30 | 20 |
| 24* | 30 | 0.5 | 15 | 15 | 40 | 30 | 25 |
| 25 | 40 | 0.5 | 20 | 20 | 45 | 15 | 5 |
| 26 | 25 | 0.5 | 12.5 | 12.5 | 60 | 15 | 5 |
| 27* | 25 | 1.0 | 0 | 25 | 60 | 15 | 10 |

Each resultant ceramic disk was provided with electrodes on its opposite sides. As a material for the electrodes, there was employed In—Ga alloy paste to prevent the ceramic disks from variations of characteristics during formation of the electrodes.

For each specimen, measurements were made of a sintering temperature, dielectric constant (ε), Q, temperature coefficient (TC) of capacitance and specific resistance under the following conditions. Results are shown in Table 2A and 2B.

The dielectric constant and Q were measured at 1 MHz, 25° C. with an impedance analyzer, Model 4192, made by Yokogawa Hewlett Packard CO.

The temperature coefficient of capacitance was determined from values of capacitance at 25° C. and 125° C. by the equation:

$\{(C_{125}-C_{25})/C_{25}(125-25)\} \times 10^6 (ppm/°C.)$ where $C_{125}$ is a capacitance measured at 125° C. and $C_{25}$ is a capacitance measured at 25° C.

The specific resistance was determined from a current measured under application of DC voltage of 500 v at 25° C.

TABLE 2

| No. | Sintering temperature (°C.) | ε | Q | TC of capacitance (ppm/°C.) | Specific resistance (Ωcm) |
|---|---|---|---|---|---|
| 1 | 950 | 8 | 1540 | +90 | $2 \times 10^{12}$ |
| 2 | 950 | 9 | 1520 | +30 | $2 \times 10^{12}$ |
| 3 | 1000 | 10 | 1630 | −70 | $4 \times 10^{12}$ |
| 4 | 1000 | 8 | 1580 | +90 | $3 \times 10^{12}$ |
| 5* | 900 | 8 | 530 | +130 | $1 \times 10^{12}$ |
| 6* | 900 | 8 | 720 | +120 | $2 \times 10^{12}$ |
| 7* | Not sintered even at 1150° C. | | | | |
| 8* | Not sintered even at 1150° C. | | | | |
| 9 | 980 | 9 | 1610 | +40 | $2 \times 10^{12}$ |
| 10 | 1000 | 9 | 1430 | +50 | $3 \times 10^{12}$ |
| 11* | Not sintered even at 1150° C. | | | | |
| 12 | 970 | 8 | 1710 | +10 | $4 \times 10^{12}$ |
| 13 | 930 | 8 | 1850 | +70 | $3 \times 10^{12}$ |
| 14 | 930 | 9 | 1530 | +70 | $3 \times 10^{12}$ |
| 15 | 930 | 9 | 1720 | +30 | $4 \times 10^{12}$ |
| 16 | 970 | 10 | 1580 | −40 | $3 \times 10^{12}$ |
| 17 | 970 | 9 | 1700 | +70 | $2 \times 10^{12}$ |
| 18* | 900 | 7 | 510 | +120 | $4 \times 10^{12}$ |
| 19* | 900 | 8 | 540 | +180 | $5 \times 10^{12}$ |
| 20* | Not sintered even at 1150° C. | | | | |
| 21* | Not sintered even at 1150° C. | | | | |
| 22 | 970 | 9 | 1820 | +40 | $2 \times 10^{12}$ |
| 23 | 950 | 10 | 1650 | +60 | $3 \times 10^{12}$ |
| 24* | Not sintered even at 1150° C. | | | | |
| 25 | 920 | 8 | 1930 | +20 | $7 \times 10^{12}$ |
| 26 | 900 | 8 | 2040 | +70 | $5 \times 10^{12}$ |
| 27 | Not sintered even at 1150° C. | | | | |

In Tables 1 and 2, specimens with an asterisk (*) are those having a composition beyond the scope of the present invention, while other specimens are those having a composition included in the scope of the present invention.

As will be understood from the data shown in these tables, the temperature compensating dielectric ceramic composition of the present invention has a sintering temperature of not more than 1000° C., a high Q value of not less than 1000, and a high specific resistance of not less than $10^{12}$ Ωcm. Further, the replacement of a part of BaO with SrO makes it possible to lower the sintering temperature of the composition.

What I claim is:

1. A temperature compensating dielectric ceramic composition consisting essentially of a solid solution composed of barium oxide, silicon oxide and zirconium oxide, said components, when calculated in terms of BaO, SiO$_2$ and ZrO$_2$ respectively and expressed by the formula:

xBaO—ySiO$_2$—zZrO$_2$ (wherein x, y and z are the weight percentages of respective components and $x+y+z=100$) having compositional proportions falling within the polygonal area defined by the points A, B, C and D in FIG. 1, the sets of x, y and z at said points A, B, C and D being as follows:

|   | x | y | z |
|---|---|---|---|
| A | 50 | 49 | 1 |
| B | 50 | 20 | 30 |
| C | 15 | 20 | 65 |
| D | 15 | 84 | 1 |

2. A temperature compensating dielectric ceramic composition consisting essentially of a basic composition and aluminum oxide incorporated therein, said basic composition consisting essentially of barium oxide, silicon oxide and zirconium oxide, said three components, when calculated in terms of BaO, SiO$_2$ and ZrO$_2$ respectively and expressed by the formula:

xBaO—ySiO$_2$—zZrO$_2$ (wherein x, y and z are the weight percentages of the respective components and $x+Y+z=100$), having compositional proportions falling within the polygonal area defined by the points A, B, C and D in FIG. 1 where $a=0$, the sets of x, y and z at said points A, B, C and D being as follows:

|   | x | y | z |
|---|---|---|---|
| A | 50 | 49 | 1 |
| B | 50 | 20 | 30 |
| C | 15 | 20 | 65 |
| D | 15 | 84 | 1 | the content of said aluminum oxide being, when calculated in terms of Al$_2$O$_3$, not more than 20 parts by weight per 100 parts by weight of said basic composition.

3. A temperature compensating dielectric ceramic composition consisting essentially of barium oxide, strontium oxide, silicon oxide and zirconium oxide, said components, when calculated in terms of BaO, SrO, SiO$_2$ and ZrO$_2$ respectively and expressed by the formula:

x(BaO$_{1-a}$SrO$_a$)—ySiO$_2$—zZrO$_2$ wherein x, y and z are the weight percentages of the respective components, $x+y+z=100$, and $0<a\leq 0.9$, have compositional proportions falling within the polygonal area defined by the points A, B, C and D in FIG. 1, the sets of x, y and z at said points A, B, C and D being as follows:

|   | x | y | z |
|---|---|---|---|
| A | 50 | 49 | 1 |
| B | 50 | 20 | 30 |
| C | 15 | 20 | 65 |
| D | 15 | 84 | 1 |

4. A temperature compensating dielectric ceramic composition consisting essentially of a basic composition and aluminum oxide incorporated therein, said basic composition consisting essentially of barium oxide, strontium oxide, silicon oxide and zirconium oxide, said components of the basic composition, when calculated in terms of BaO, SrO, SiO$_2$ and ZrO$_2$ respectively and expressed by the formula:

x(BaO$_{1-a}$SrO$_a$)—ySiO$_2$—zZrO$_2$ wherein x, y and z are the weight percentages of the respective components, $x+y+z=100$, and $0<\alpha \leq 0.9$, having compositional proportions falling within the polygonal area defined by the points A, B, C and D in FIG. 1, the sets of X, y and z at said points A, B, C and D being as follows:

|   | x | y | z |
|---|---|---|---|
| A | 50 | 49 | 1 |
| B | 50 | 20 | 30 |
| C | 15 | 20 | 65 |
| D | 15 | 84 | 1 | the content of said aluminum oxide being not more than 20 parts by weight in terms of $Al_2O_3$ per 100 parts by weight of the basic composition.

* * * * *